United States Patent
Archer et al.

(10) Patent No.: US 8,556,715 B2
(45) Date of Patent: Oct. 15, 2013

(54) PERSONALIZED CLIENT-SIDE VISUALIZATION IN A MULTIPLAYER NETWORK VIDEO GAME

(75) Inventors: Christopher R. Archer, Sammamish, WA (US); Dusty H. Welch, Camarillo, CA (US)

(73) Assignee: U4IA Games Inc., Redmond, WA (US)

( * ) Notice: Subject to any disclaimer, the term of this patent is extended or adjusted under 35 U.S.C. 154(b) by 0 days.

(21) Appl. No.: 13/246,039

(22) Filed: Sep. 27, 2011

(65) Prior Publication Data

US 2013/0079132 A1 Mar. 28, 2013

(51) Int. Cl.
*G06F 17/00* (2006.01)

(52) U.S. Cl.
USPC .......................................................... 463/31

(58) Field of Classification Search
USPC .............................. 463/16, 20, 25, 29–31, 42
See application file for complete search history.

(56) References Cited

U.S. PATENT DOCUMENTS

| | | | |
|---|---|---|---|
| 5,634,849 A | 6/1997 | Abecassis | |
| 6,009,458 A | 12/1999 | Hawkins et al. | |
| 7,614,955 B2 | 11/2009 | Farnham et al. | |
| 7,867,094 B1 * | 1/2011 | Wisdom et al. | 463/43 |
| 7,890,547 B2 * | 2/2011 | Hotti | 707/803 |
| 2004/0229698 A1 | 11/2004 | Lind et al. | |
| 2007/0124781 A1 * | 5/2007 | Casey et al. | 725/94 |
| 2007/0255708 A1 * | 11/2007 | Morita et al. | 707/7 |
| 2007/0265073 A1 * | 11/2007 | Novi et al. | 463/35 |
| 2009/0098943 A1 * | 4/2009 | Weber et al. | 463/42 |
| 2011/0098118 A1 | 4/2011 | Muir et al. | |

OTHER PUBLICATIONS

International Search Report mailed Oct. 26, 2012, for PCT Application No. PCT/US2012/050193, filed Aug. 9, 2012, three pages.

* cited by examiner

*Primary Examiner* — Ronald Laneau
(74) *Attorney, Agent, or Firm* — Morrison & Foerster LLP

(57) ABSTRACT

A method for providing customized content in a video game over a computer network to a plurality of game clients operated by different players is disclosed The method includes: storing a library of content that can be selectively delivered to the plurality of game clients during gameplay of the video game; receiving information about each of the players from the respective game client; selecting content from the library to be delivered to each of the game clients based on the received information about the respective player; and synchronously delivering the selected content to the corresponding game client.

28 Claims, 4 Drawing Sheets

PERSONALIZED CLIENT-SIDE VISUALIZATION IN A MULTIPLAYER NETWORK VIDEO GAME

FIELD

The present invention relates generally to providing content over a network to multiple users, and more particularly, to providing personalized client-side visualization to multiple players playing a video game synchronously over a network.

BACKGROUND

Multiplayer network games have been around for a long time. Currently, many games, including both personal computer (PC) games and video console games (e.g., games run on game consoles such as Sony PlayStation®, PSP®, Nintendo Wii®, DS®, and Microsoft Xbox®), support at least one network mode or online-mode which allows multiple players to play in the same game environment at the same time over a network. In fact, some games are designed to be played online only. Games that can be played over a network or online can be found in almost all popular genres of videogames including, but not limited to, shooter (e.g., first-person and third-person), fighting, action-adventure, racing, sports, rhythm (e.g., music), strategy, and role-playing games (RPG). When playing in the online-mode, players can choose to play either in a competitive mode or a co-op mode, depending on the particular game. Typically, to initiate a game, each player logs onto a central server hosting the game on a network from their respective PCs or game consoles. For some games, the central game server may also provide a pairing service to allow players to find playing partners. A game session may start after all participating players have successfully joined and been authenticated by the server. Alternatively, some games allow players to join an ongoing game session after the game has already started.

Having an online mode is usually an advantage for most video games. Not only does it allow multiple gamers to play with or against each other in the same game session, it does so without requiring that they be in the same physical location or sharing the same display. With adequate network speed, gamers at different physical locations can battle each other in a game in real time as if they are sitting next to each other and playing the game from the same PC or game console. In fact, it is not uncommon to have players located in different parts of the world engaging each other in an online game session.

However, the online mode of most if not all currently available video games does not usually differ significantly from the corresponding local multi-players mode, except that in the local mode, the players typically share a screen divided into different windows, one for each player. That is, video games have traditionally been designed so that, in their multiplayer mode (local or online), every player shares the same virtual environment in which the game is being played. In particular, the visual appearances and movements of the characters and the visualization of the virtual environment of the game would appear the same to all players playing synchronously in the same game session. This may provide a level of consistency in the gaming experience among the different players. Nevertheless, there are inherent problems with presenting the same visualization of the game to all players, who in real life may be very different from one another, although they are participating in the same game session.

For example, certain contents in a game may be appropriate for players in a certain age group, but not for players in a different age group. A game rated "M 17+" containing extreme violent content may only be suitable for players over 17 years of age. As a result, an adult gamer and a minor may not be able to play against each other in the same game online. As another example, players from different countries and/or with different cultural backgrounds may be attracted to games with different characters and settings due to their own respective backgrounds. For example, an Asian gamer may find a video game set in Asia and with characters from Asian animations more appealing while an American gamer may be more interested in games with a more western visual set and characters from, for example, the Marvel comics. However, as mentioned above, conventional video games are programmed as such that, when being played synchronously by multiple players, all players share the same virtual environment in the game including the characters, surroundings, and other types of content provided in the game. Because of the diversity among the potential players of any video game, especially the ones that support a multiplayer online mode, providing the same content to all players may not be ideal because of the appropriateness of the content to certain player demographics and the vastly different taste of the players. It can negatively affect the gaming experience for some of the players. Furthermore, it may significantly limit the potential market for a given video game.

Embodiments of this invention provide various solutions for the issues identified above.

SUMMARY

The present invention relates to systems and methods for providing personalized content in a network video game to multiple players while the players are playing simultaneously in the same game session. The personalized content can be based on one or more factors associated with each individual player. In various embodiments, the factors can include, but are not limited to, the player's age, gender, internet protocol (IP) address, physical location, nationality, experience level, and personal interests. The aspects of the game that can be personalized for individual players can include, but are not limited to, the visualization (i.e., graphics) of the game including, for example, the appearance of the characters and virtual sets in the game, the sound track of the game, and the language used in the game. Other aspects of the game, such as, the overall gameplay design and objective the game, can remain universal to all players. As such, the same game can be made enjoyable for players with different backgrounds playing synchronously over a network.

Because the look and feel of the game can be personalized, the appeal of the particular game can increase to a wider range of gamers than the game would normally have. In addition, the present invention can also ensure that the appropriate content is delivered to each individual player based on his/her profile. This, in turn, can help facilitate synchronous online play of the same game by players of different ages and maturities. The present invention can also allow multiple players to experience different visuals, sound, and other aspects of the game that are tailored to their likings (or that are appropriate for them) while playing the same game in a real-time and synchronous fashion with each other.

DETAILED DESCRIPTION

In the following description of preferred embodiments, reference is made to the accompanying drawings which form a part hereof, and in which it is shown by way of illustration specific embodiments in which the disclosure can be practiced. It is to be understood that other embodiments can be used and structural changes can be made without departing from the scope of the embodiments of this disclosure.

The present invention relates to systems and methods for providing personalized content in a network video game to multiple players while the players are playing simultaneously in the same game session. The personalized content can be based on one or more factors associated with each individual player. In various embodiments, the factors can include, but are not limited to, the player's age, gender, internet protocol (IP) address, physical location, nationality, experience level, and personal interests. The aspects of the game that can be personalized for individual players can include, but are not limited to, the visualization (i.e., graphics) of the game including, for example, the appearance of the characters and virtual sets in the game, the sound track of the game, and the language used in the game. Other aspects of the game, such as, the overall gameplay design and objective the game, can remain universal to all players. As such, the same game can be made enjoyable for players with different backgrounds playing synchronously over a network.

Because the look and feel of the game can be personalized, the appeal of the particular game can increase to a wider range of gamers than the game would normally have. In addition, the present invention can also ensure that the appropriate content is delivered to each individual player based on his/her profile. This, in turn, can help facilitate synchronous online play of the same game by players of different ages and maturities. The present invention can also allow multiple players to experience different visuals, sound, and other aspects of the game that are tailored to their likings (or that are appropriate for them) while playing the same game in a real-time and synchronous fashion with each other. Exemplary embodiments are discussed in detail in the paragraphs below.

Figure 1:
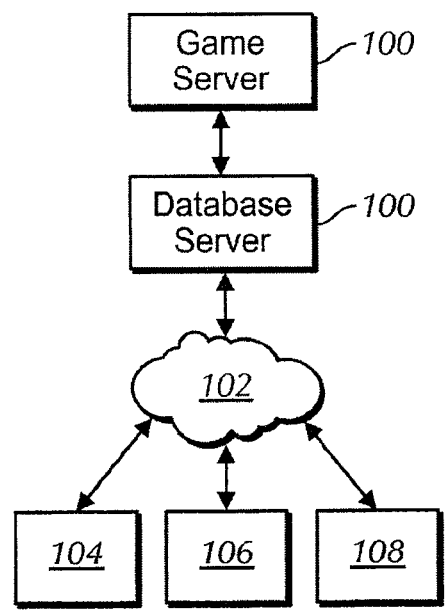
FIG. 1 illustrates the exemplary components of a network for supporting a multiplayer network game according to embodiments of the invention.

FIG. 1 illustrates an exemplary game network 102 including a central game server 100 for facilitating multiplayer online video game playing according to an embodiment of this invention. In this embodiment, the game server 100 can be connected to a database server 110. In some embodiments, a single physical server can serve as both the game server 110 and the database server 110. Multiple game clients 104, 106, 108 can be connected to the database server 110 via a computer network 102. Although only three game clients 104, 106, 108 are shown in FIG. 1, it should be understood that the network 112 can be configured to support a different number of game clients.

The game clients 104, 106, 108 can be PCs, video game consoles, portable electronic devices such as smartphones and tablet PCs, or any other types of devices that support video games. The game clients 104, 106, 108 can provide an interface for players to play various video games, at least some of which can have a network mode. Depending on the type of game clients 104, 106, 108 (e.g., PC-based or console-based) used for playing a particular game and the configuration and requirements of the game's online mode, at least a portion of the game may have to be installed and/or run on the game clients 104, 106, 108.

The computer network 102 can be any existing network including, but not limited to, a local area network (LAN), wide area network (WAN), cellular network, WiFi network, and other wireless networks suitable for supporting network video games. In some embodiments, the network 102 can be a public network such as the internet. In other embodiments, the network 102 can be a dedicated network (e.g., a virtual private network (VPN)) set up for the sole purpose of supporting network play of one or more video games. The network 102 can have a far reach that allows players from different parts of the world to access the game server 100 at the same time to play with or against each other in real time.

Figure 2:
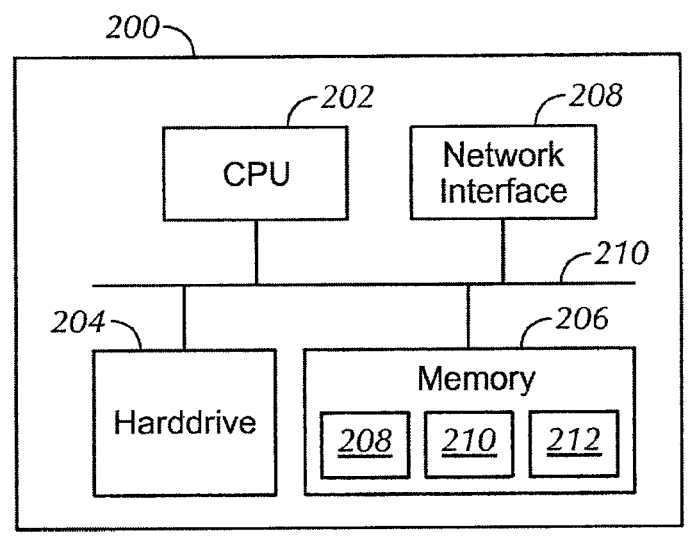
FIG. 2 illustrates the exemplary components of a computer that can serve as the database server and/or the game server in a gaming network according to embodiments of the invention.

The database server 110 and the game server 100 can be servers hosted at a central location and connected to the network 102. Both the game server 100 and the game server can include some of the components of a typical computer. FIG. 2 illustrates the exemplary components of a computer that can be used as the database server 110 and/or the game server 100. As illustrated, the computer 200 can include a central processing unit (CPU) 202, hard disk drive 204, memory 206, and network interface 208, all of which can be connected to each other via a system bus 210. One or more of the functions of the database server 110 and the game server 100 in providing personalized content to multiple players of a network game can be performed by the components illustrated in FIG. 2 via software programs stored in the memory 206 (or other types of storage devices such as the hard disk drive 204) of the computer 200 and executed by the processor 202.

In some embodiments, one or more programs for running the video game can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

In this embodiment, as illustrated in FIG. 2, one or more programs 208, 210, 212 required for running the video game can be stored in the memory 206 of the computer 200. If the computer 200 is the database server, the programs 208, 210, 212 can include a database program for tracking player data, a program for profiling players based on the player data, and another program for customizing game settings and content for each individual players based on their profile. If the computer 200 is the game server, the programs 208, 210, 212 can include an authentication program for verifying whether a user has permission to play a particular game hosted on the game server. A part or a complete copy of the game itself may be another program stored on the game server. In some embodiments, the game server can include multiple versions of the art sets, characters, animations, video clips, sound track, and other contents in the game that are tailored to different players or player groups. These different versions of game content can be used to personalize the version of the game each player sees while playing online with other players. In various embodiments of the invention, each of the programs, including those mentioned above, required for running the video game over the network can reside in either the database server or the game server. In the following paragraphs, the interactions among the clients, database server, and game server will be discussed in detail.

Figure 3:
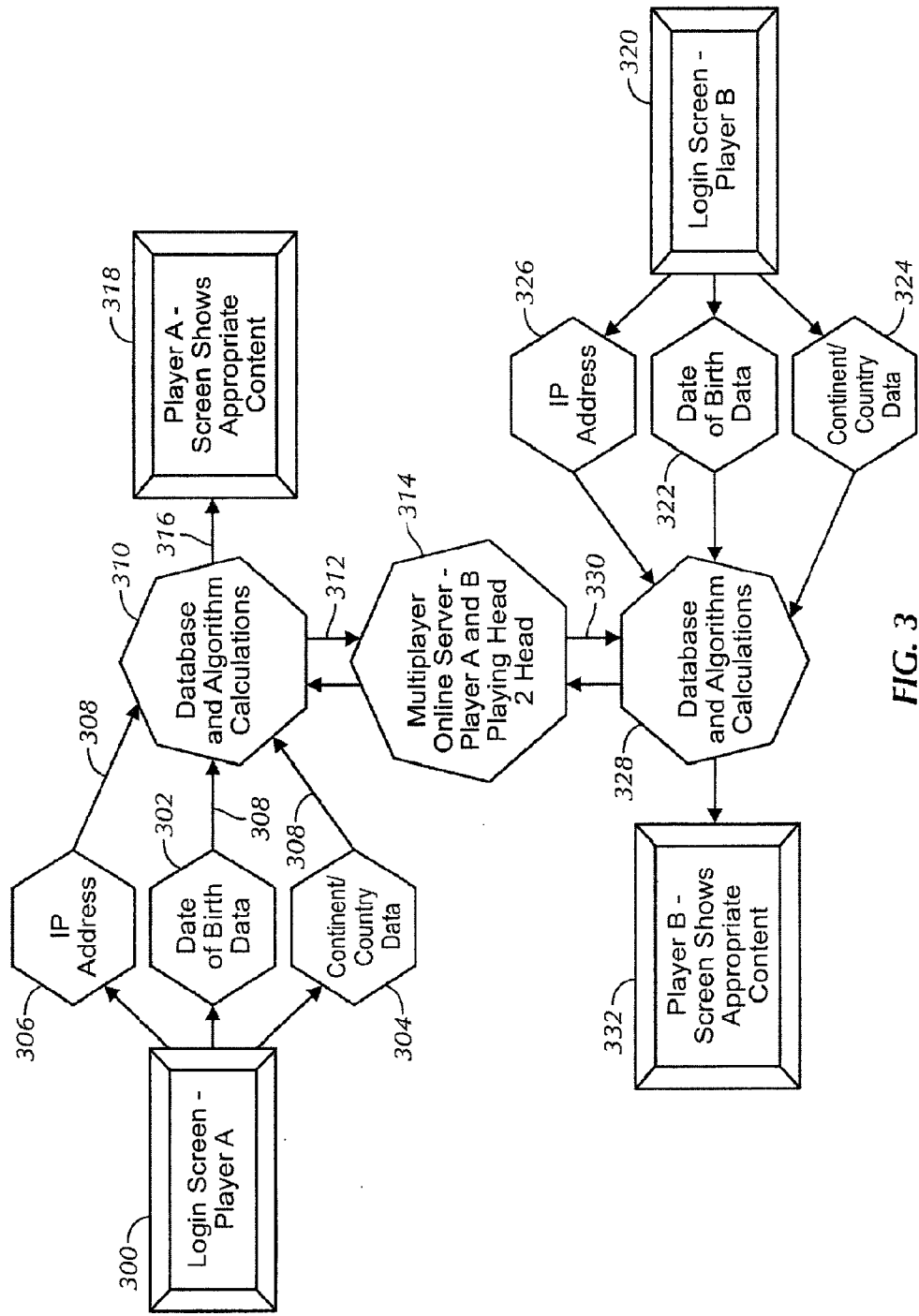
FIG. 3 illustrates the interactions among multiple game clients, database server, and game server in an exemplary process of initiating a multiplayer network video game according to embodiments of the invention.

FIG. 3 illustrates the interactions among the game clients, database server, and game server in an exemplary process of initiating a multiplayer network game in which personalized game contents can be provided to each player's game client based on the player's profile. This can allow the players to be able to playing the same game in a synchronous fashion with each other while enjoying a personalized gaming experience appropriate and/or tailored to their age group, gender, nationality, cultural background, personal preferences and taste, etc.

As illustrated in FIG. 3, player A can log into the game via a login screen displayed on his game client 300. The login process can involve inputting his username and password. In this embodiment, Player A can also be asked to submit other personal information, such as his data of birth 302 and the continent/country in which he is located 304 during the login process. Other information such as his IP address 306 can be captured automatically without his input. It should be understood that, in various embodiments, the type of information requested from each player can vary and may include information such as the player's gender, personal interests, favorite fictional character, favorite movie, and any information that can assist in providing a version of the game that is best suited for the player.

Figures 4, 5:
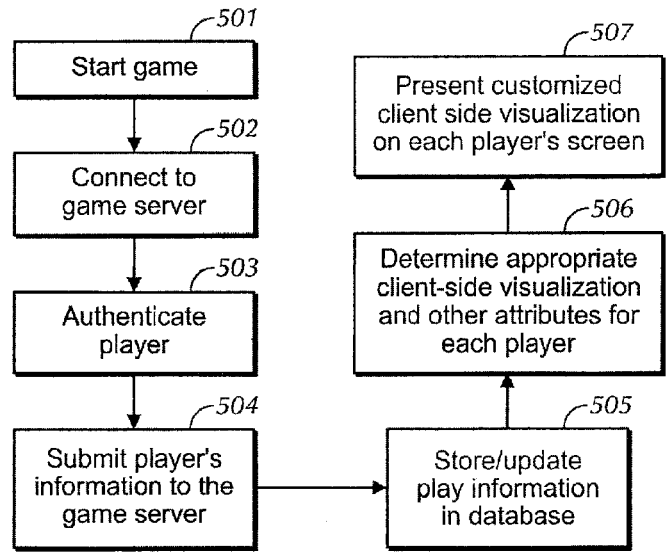
FIG. 4 illustrates an exemplary database table for storing player information according to embodiments of the invention.
FIG. 5 is a flow chart summarizing the exemplary steps in providing personalized client-side content to the players of a multiplayer online game according to embodiments of this invention.

The information submitted by Player A or captured from his game client can be transmitted to the database server over a network 308. The database server can include a database for storing the collected player information. FIG. 4 illustrates an exemplary database table 400 for storing player data. The table in FIG. 4 includes exemplary columns entitled "Player ID" 402, "Username" 404, "Password" 406, "Age" 408, "Continent/Country" 410, and "IP Address" 412. Player information 414 received from different players of the game can be stored in the corresponding columns of the database table 400. It should be understood that FIG. 4 merely illustrates one example of the database table in the database server. In various embodiments, one or more of the columns can be optional. The database can include additional columns to capture other types of player information. The type of database systems used can also vary in different embodiments of the invention.

Referring back to FIG. 3, after the database server collects data on a particular player, the data can be processed based on an algorithm to determine the optimal game settings and/or appropriate content for the player 310. For example, Player A, who is a 13-year old American boy accessing the network from an IP address in Chicago, can be matched to game settings and content that are appropriate for a player in the age group of 11-13. The algorithm can further narrow down the content available for him to the content that will most likely appeal to an American teenage boy. For example, the language of the game can be set to English because Player A is American. Player A can be restricted to only be able to create or use a character that is appropriate for his age (e.g., a comic character). Like the player's own character, the other characters in the game can also be personalized based on the player's profile. For example, only certain categories of characters pre-programmed in the game can appear on Player A's screen. These characters can be chosen based on their popularities with the player's demographic characteristics (e.g., age, gender). They can also be chosen based on whether they are appropriate for the player. Similarly, other aspects of the game can also be personalized for Player A based on his profile using the same algorithm. For example, actions or scenes in the game that involve excessive violence can be toned down or replaced by more kid-friendly actions on Player A's screen without departing from the scheme of the game.

As mentioned above, in some embodiments, the game server can store a library of content including multiple versions of the art sets, characters, animations, video clips, sound track, and other contents for the game. Each version can be tailored to different players or player groups. In some embodiments, additional customization by the player within a version can also be allowed. An example of this will be discussed below.

As illustrated in FIG. 3, the database server can communicate to the game server a profile of Player A 312. In one embodiment, the database server, using the pre-programmed algorithm, can assign Player A a unique ID corresponding to one of the preset versions of the game (e.g., a version tailored to American players in the age group of 11-13). The unique ID can be passed to the game server. Based on the unique ID, the game server can control the version of the content in various aspects of the game to be delivered to Player A by selecting from the library certain art sets, characters, animations, video clips, sound track, and other contents of the game that are best suited for Player A 314. In other embodiments, the database server and the game server can communicate with each other regarding the players of the game and their group assignments by other suitable means known in the art.

In one embodiment where the game allows the players to customize certain aspects of the game, e.g., building his/her own character, the game server can present to each player a virtual market place that offers the various options for building a personalized character for that player 316. The options being displayed on the player's screen can only include those that match with the player's profile 318. For example, Player A, who is a 13 year old American male, can only be presented with the options of using body parts of comic characters and animals to build his in-game character. From these options, he can build a character, for example with a lizard head, chicken legs, wearing a Hawaiian shirt, and using a water gun as his weapon. Although the game library may include other options for building characters, these other options can be only made available to more mature players, and thus will not be selectable or even shown to Player A.

The same process described above regarding Player A can be similarly undertaken by other players to join the same game and play with or against Player A. As illustrated in FIG.

3, a second player, Player B can initiate the game from his own game client at a different remote location. Player B can also log in to the game network via a login screen displayed on his game client 320. He can also submit information such as his date of birth data 322, continent/country data 324 during the login process. Other information such as his IP address 326 can be captured automatically and transmitted to the database server. The database on the database server can also store Player B's information. In one embodiment, as shown in the database table of FIG. 4, Player B can be a 20-year old South Korean player accessing the game from an IP address in Seoul, South Korea.

Referring back to FIG. 3, the database server can process the player information associated with Player B using the same pre-programmed algorithm stored in the database server 328. Although FIG. 3 shows two blocks 310, 328 representing the processes performed by the database server on Player A's and Player B's player data, respectively, it should be understood that the storing and processing of all players' data can be carried out by a single database server. Because Player B is a 20-year old South Korean player, the database server can match Player B to a specific player group (e.g., Asian gamers in the 17+ age group) using the pre-programmed algorithm and assign Player B a unique ID corresponding to another preset version of the game best suited for the 17+ Asian gamer group.

The database server can then pass the unique ID associated with Player B to the game server 330. Based on the ID, the game server can select from the library of game content certain art sets, characters, animations, video clips, sound track, and other types of contents of the game that are best suited for Player B 314. The selected content can be delivered to Player B's game client at various stages of game as being played by Player B 332.

In this embodiment, because Player B is older than Player A, he can have access to the more mature content of the game that may not be available to Player A. For example, content that would have earned the game an "M 17+" rating can be shown on Player B's display 332, but not to Player A. Similarly, no restrictions are set with regard to the in-game character(s) Player B can create, select, or encounter during the game. For example, Player B can have the option of creating a camouflaged special force character, which would not have been an option for Player A. Additionally or alternatively, other aspects of the game, such as the other characters and the virtual sets of the game, can also be customized to have an Asian theme to match Player B's profile. For example, on Player B's screen, all the text in the game can be translated into Korean. Similarly, Korean pop music can be used as the sound track of the game to make the game more appealing to Player B. A different sound track comprising songs popular with American teenagers can be played on Player A's game client to enhance Player A's gaming experience.

In the embodiment illustrated in FIG. 3, after both players successfully connected to the game server and joined the same game session, the game can start and the players can play cooperatively or against each other to achieve one or more objectives of the game. According to this embodiment, although the players are in fact playing the same game synchronously, various aspects of the game can appear differently on the screen of each player's game client. In other words, at least some of the content that is being streamed to each player's game client in real time may differ so that the game can be personalized to match each player's profile and taste.

For example, the same character may appear differently to different players as they see it on their screen. Each stage (or virtual set) in the game can also have different looks (e.g., western vs. Asian) to each player, although the different versions should make no difference for each player to navigate. Essentially, different players in the same game can enjoy different visual and/or audio presentations of the game without knowing that what they are experiencing is actually different from what the other players in the same game are experiencing.

In this embodiment, the underlying rules, conditions, and objectives of the game can remain the same to all players to retain the real-time, synchronous nature of online multiplayer games. In other words, the customizable aspects of the game can have little or no effect on the actual gameplay during the game. In one embodiment, the gameplay aspect of the game can be controlled by a program separate from the program for customizing the look and feel of the game for each player.

FIG. 5 is a flow chart summarizing the exemplary steps in the process of delivering personalized content to multiple players participating in a multiplayer network game according to an embodiment of this invention. First, each participating player can start the game from his/her game client such as a PC or a game console (step 501). They can then attempt to connect to the central game server by, for example, selecting the online mode of the game (step 502). The central game server may request the players to authenticate themselves before permitting them to access the game online (step 503). In one embodiment, when a play connects to the central game server for the first time, he/she may be required to register for a username and password. When the player log onto the central game server, he/she also can be asked to provide various information about himself/herself (step 504). As mentioned in the embodiments discussed above, such information can include the age, gender, geographic location, nationality, IP address, and personal interests of the player. The information is then saved in a database on a data server connected to the central game server (step 505). Each player's information can be updated when they are logged onto the game network. The stored player information can be used to customize various aspects of the game for each individual player using a pre-programmed algorithm (step 506). The customized content can include, for example, various visual aspects of the game such as the appearances of the characters and sets in the game. After all players successfully joined the game, the customized content can be streamed to each player's game client to provide, for example, unique client-side visualization, sound, and other characteristics of the game (step 507).

Figure 6A:
FIGS. 6a and 6b illustrate exemplary screens displayed on two players' respective game clients as the players play synchronously in a network game according to embodiments of the invention.
Figure 6B:

FIGS. 6a and 6b illustrate exemplary screen shots from two players' respective game clients as they play against each other in the same game session. The players can be Player A (13-year old American) and Player B (20-year old Korean) from the embodiments discussed above. FIG. 6a illustrates an exemplary game view from Player A's perspective. FIG. 6a illustrates that Player A can be represented by a character 600 with a lizard head, chicken legs, wearing Hawaiian shirt, and equipped with a water gun as his weapon. As discussed above, this character can be appropriate for a player of Player A's age and background. Similarly, other attributes of the game can also be customized according to Player A's profile. For example, other characters in the games including the ones representing the other players can be restricted to those with kid-friendly appearances. As illustrated in FIG. 6a, Player B's character can be shown as a robot character 602 with tentacle arms and a unique sphere head with one eye.

FIG. 6b illustrates an exemplary game view from Player B's perspective in the same game session. In this view, Player A's character can be seen as a military character wearing body armor 604 instead of the lizard-head figure shown on Player A's screen as illustrated in FIG. 6a. This is because that the database server has determined from Player B's information (e.g., age) that he may prefer a more matured visualization of the game. A cartoonish character may make the game less appealing to Player B based on his age. Accordingly, even though Player A has created his character as the lizard-head figure, the game server can instead display the military character 604 on Player B's screen. As previously noted, although Player B's in-game character can have different appearances on Player A and Player B's respective screens, the behavior of Player B's character including its movement and interactions with other characters and how it affects the flow and outcome of the game can be the same to every player in the game in spite of the different personalized client-side visualization of the character.

FIG. 6b also illustrates that Player B's own character in the game can actually be a camouflaged special force character 606. This can be the character created by Player B at the beginning of the game. Because the camouflaged special force character 606 may be determined to be inappropriate or less appealing to Player A, Player B's camouflaged special force character 606 can be shown instead as the robot character 602 with tentacle arms and a unique sphere head with one eye on Player A's screen shown in FIG. 6a.

FIGS. 6a and 6b only illustrate one visual aspect of the game that can be personalized for each player during synchronous gameplay. It should be understood that other attributes of the game can also be customized when output to each player's game client. For example, although not illustrated in the screen shots of FIGS. 6a and 6b, the buildings or structures in a particular virtual set of the game may appear differently on Player A and Player B's screens. Western-styled buildings may appear on Player A's screen while Asian-styled buildings can occupy the same virtual space on Player B's screen. As previously discussed, other attributes of the games such as sound and language can also be customized based on the players' individual profiles.

There are numerous advantages from using the systems and methods in the various embodiments of the present invention as disclosed above. For example, by displaying age or globally appropriate content for each player based on a number of factors such as player's age, territory, interest, etc., the embodiments of the invention make it possible to cater the same game to a more diverse audience. In some cases, games with content that may not be appropriate for players of certain age or residing in certain areas of the world can be modified to deliver a more appropriate version of the game that makes the game suitable for players in different areas of the world, as well as creating a version that could be acceptable to younger audiences.

For example, games that would otherwise be rated "M 17+" and not recommended for players younger than 17 can now be made accessible to these younger player without exposing inappropriate content to them. Furthermore, by delivering content tailored to individual player's likings, the various embodiments make the same game attractive to players with different backgrounds. Games that would have been well-received by one group of players can become popular with another group because of the individualized content delivering system disclosed herein.

Although the embodiments above are described in the context of a real-time multiplayer network video game, it should be understood that the same systems and methods can be adopted in other types of virtual environment to achieve similar goals and benefits such as to provide appropriate content to different groups of audiences and make the virtual environment more friendly and appealing to user of different demographics. Examples of such virtual environment can include, for example, interactive forums and virtual markets accessible online to users from different parts of the world.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A system for providing customized content in a video game over a computer network to a plurality of game clients operated by different players, the system comprising:
   a processor;
   a network interface for connecting the system to the multiple game clients;
   a first storage device for storing a library of content that can be selectively delivered to the plurality of game clients during gameplay of the video game;
   a second storage device storing a program which, when executed by the processor, performs the steps of:
      receiving information about a first and a second players from their respective game clients;
      selecting a first content and a second content from the library to be delivered to the first and second game clients, respectively, based on the received information about the respective players, the first content different from the second content; and
      delivering the selected first and second contents representing a same attribute of the video game via the network interface to the first and second game clients during real-time synchronous gameplay between the two game clients.

2. The system of claim 1, wherein the library comprises different categories of content.

3. The system of claim 2, wherein the different categories of content comprises at least one of art set, character, animation, video clip, and sound track.

4. The system of claim 1, wherein the information about each of the players comprises at least one of the player's age, gender, place of residence, nationality, IP address, and personal interests.

5. The system of claim 4, wherein the information about each of the players comprises the player's age, and wherein content appropriate for players of that age is selected from the library and delivered to the player's game client during gameplay.

6. The system of claim 4, wherein the information about each of the players comprises the player's nationality, and wherein content appealing to players of that nationality is selected from the library and delivered to the player's game client during gameplay.

7. The system of claim 1, further comprising a third storage device for storing the received information about each of the players.

8. The system of claim 1, wherein the first storage device and the second storage device are the same device.

9. The system of claim 1, wherein synchronously delivering the selected content for each game client further comprises providing different visualization of the video game on each game client.

10. The system of claim 1, wherein synchronously delivering the selected content for each game client further comprises providing different soundtracks of the video game to each game client.

11. A method for providing customized content in a video game over a computer network to a plurality of game clients operated by different players, the method comprising:
 storing a library of content that can be selectively delivered over the computer network to the plurality of game clients during gameplay of the video game;
 receiving information about a first and a second players from their respective game clients over the computer network;
 selecting a first content and a second content from the library to be delivered to the first and second game clients, respectively, based on the received information about the respective player, the first content different from the second content; and
 delivering the selected first and second contents representing a same attribute of the video game via the network interface to the first and second game clients during real-time synchronous gameplay between the two game clients.

12. The method of claim 11, wherein the library comprises different categories of content.

13. The method of claim 12, wherein the different categories of content comprises at least one of art set, character, animation, video clip, and sound track.

14. The method of claim 11, wherein the information about each of the players comprises at least one of the player's age, gender, place of residence, nationality, IP address, and personal interests.

15. The method of claim 14, wherein the information about each of the players comprises the player's age, and wherein the method further comprises selecting content appropriate for players of that age from the library to be delivered to the player's game client during gameplay.

16. The method of claim 14, wherein the information about each of the players comprises the player's nationality, and wherein the method further comprises selecting content appealing to players of that nationality from the library to be delivered to the player's game client during gameplay.

17. The method of claim 11, further comprising storing the received information about each of the players.

18. The method of claim 17, wherein the library of content and the information about each of the players are stored on the same storage device.

19. The method of claim 11, wherein synchronously delivering the selected content for each game client further comprises providing different visualization of the video game on each game client.

20. The system of claim 11, wherein synchronously delivering the selected content for each game client further comprises providing different soundtracks of the video game to each game client.

21. A non-transitory computer-readable storage medium storing a program which, when executed by a processor, performs the steps of:
 storing a library of content that can be selectively delivered to a plurality of game clients during gameplay of the video game;
 receiving information about a first and a second players from their respective game clients;
 selecting a first content and a second content from the library to be delivered to the first and second game clients, respectively, based on the received information about the respective player, the first content different from the second content; and
 delivering the selected first and second contents representing a same attribute of the video game via the network interface to the first and second game clients during real-time synchronous gameplay between the two game clients.

22. The non-transitory computer-readable storage medium of claim 21, wherein the stored content comprises content in categories including at least one of art set, character, animation, video clip, and sound track.

23. The non-transitory computer-readable storage medium of claim 21, wherein the information about each of the players comprises at least one of the player's age, gender, place of residence, nationality, IP address, and personal interests.

24. The non-transitory computer-readable storage medium of claim 23, wherein the information about each of the players comprises the player's age, and wherein content appropriate for players of that age is selected from the library and delivered to the player's game client during gameplay.

25. The non-transitory computer-readable storage medium of claim 23, wherein the information about each of the players comprises the player's nationality, and wherein content appealing to players of that nationality is selected from the library and delivered to the player's game client during gameplay.

26. The non-transitory computer-readable storage medium of claim 21, further comprising storing the received information about each of the players.

27. The non-transitory computer-readable storage medium of claim 21, wherein synchronously delivering the selected content for each game client further comprises providing different visualization of the video game on each game client.

28. The non-transitory computer-readable storage medium of claim 21, wherein synchronously delivering the selected content for each game client further comprises providing different soundtracks of the video game to each game client.

* * * * *